(No Model.)

S. DARLING.
Graduated Measuring Rule.

No. 230,619. Patented Aug. 3, 1880.

Witnesses:
Benjamin Gridley
Horace Thurston Jr.

Inventor:
Saml Darling

UNITED STATES PATENT OFFICE.

SAMUEL DARLING, OF PROVIDENCE, RHODE ISLAND.

GRADUATED MEASURING-RULE.

SPECIFICATION forming part of Letters Patent No. 230,619, dated August 3, 1880.

Application filed June 11, 1880. (No model.)

*To all whom it may concern:*

Be it known that I, SAMUEL DARLING, a citizen of the United States, residing at Providence, in the county of Providence and State of Rhode Island, have invented a new and useful Improvement in Graduated Measuring-Rulers; and I do hereby declare that the following specification, taken in connection with the accompanying drawings, forming a part of the same, is a full, clear, and exact description thereof.

My improved ruler is intended and adapted more especially for the use of draftsmen, but is very convenient for all classes of artisans and mechanics.

Rulers for draftsmen have been made in a great variety of forms and of many kinds of material. Formerly they were made quite thin, with wide plain surfaces and beveled edges; but latterly different forms have come into use, the triangular being the most used at the present time.

A three-leg metallic ruler, its sides being at an angle of thirty degrees, has been considerably used.

The triangular rulers have usually been made of box-wood; but that material is not reliable as to retaining its length and straightness, as it is expanded, contracted, crooked, and warped by different states of the atmosphere, and the sharp corners are easily bruised and broken off.

Figure 4:
Figure 5:

An effort is now being made to make the triangular ruler of metal, in tubular form, Fig. 5, (shell of equal thickness,) the external shape being the same as that of the present triangular box-wood rulers. The objections to such a ruler are too much weight, too expensive, and inconvenience. The three-leg ruler, Fig. 4, is also too expensive and not convenient, its sides being too flat, while the sides of the triangular are too steep for convenient use.

The object of my invention is to make a metallic graduated ruler that shall be sufficiently cheap, light, and convenient to meet the wants of all classes of consumers, and that shall have a supplemental graduation particularly adapted to the setting of dividers to one-tenth (more or less) of the finest graduated spaces on the ruler.

Figure 8:
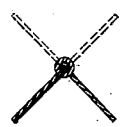
Figure 1:
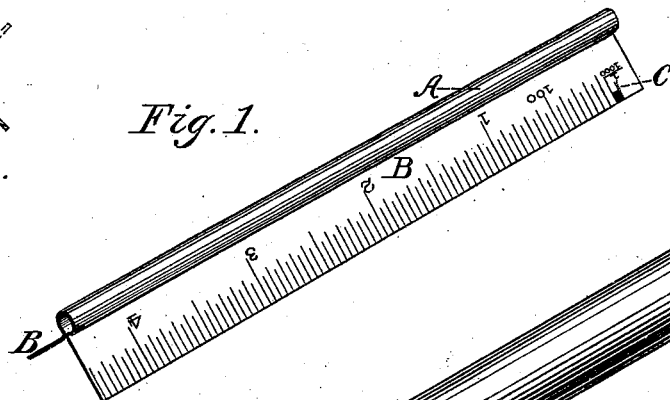
Figure 7:
Figure 3:
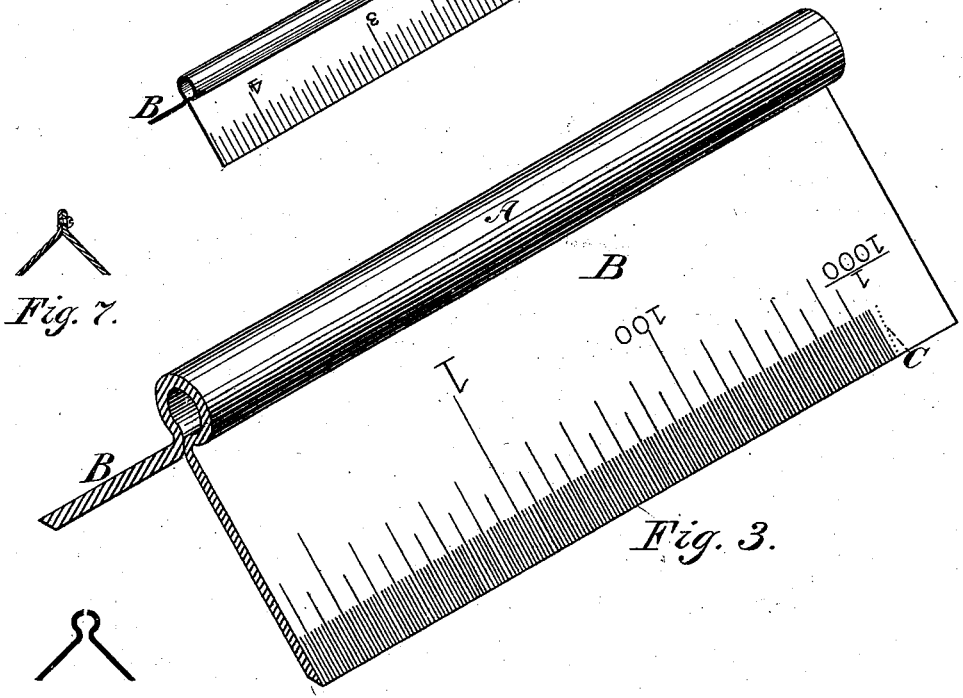
Figure 6:
Figure 2:

In the drawings, Figure 1 represents, in perspective, a portion of my improved ruler; Fig. 2, a transverse section of the same; Fig. 3, an enlarged view in perspective; Fig. 4, a cross-section of a three-leg ruler; Fig. 5, cross-section of a hollow triangular ruler, the two latter being now in use; Figs. 6, 7, and 8, cross-sections of different forms of making my improved ruler.

My improvement consists in making a metallic graduated ruler with two legs or faces, B, standing preferably at an angle of forty-five degrees, and diverging from a tubular apex, A, which apex, however, may be made in any convenient form for manipulation.

I prefer to make the ruler of one piece of thin metal; but it may be made in two or more pieces and fastened together by brazing, soldering, or any other method of doing such work; and for convenience in manufacturing it may be made in two pieces, as shown in cross-section, Fig. 6, and be soldered, brazed, or riveted; or it may be made so that one leg can be removed and another put in its place and held together by screws or clamps, as shown in Fig. 7. One or both legs or faces may be graduated, but both legs need not necessarily be of the same shape or stand at the same angle. One leg or side may be made in any shape that will hold the other leg or face in a proper position for use.

The two legs may be pivoted at the apex, like a butt or hinge, and the legs be arranged to be set at any angle desired, and so that the inside and the outside of the legs may change positions, as shown in cross-section in Fig. 8, in which case both sides of the legs can be graduated and used with equal convenience.

I limit myself in this part of my invention to a graduated ruler with two legs or faces, one or both standing at a convenient angle for the use of draftsmen, and terminating in a tubular apex or some other form of apex convenient for manipulating the ruler.

My improvement also consists in making a line of small conical pricks, C, at an angle with the graduation-lines of the ruler.

It is well known to draftsmen that a ruler having the least number of graduated scales is the most convenient one, other things being equal, and vice versa.

When there are several kinds of graduated spaces on one ruler, like the triangular, Fig. 5, every time the draftsman takes it up to use he has to examine to find the divisions he is using, unless he applies a special fixture to the ruler to indicate it; hence that kind of ruler is rejected by a large proportion of draftsmen, some of which rulers have as many as twelve different kinds of graduations.

My improved ruler can be manufactured for about one-fifth the cost of the hollow triangular ruler shown in Fig. 5, and one leading feature in my improved ruler is that it can be manufactured so cheaply with two scales on each ruler that the draftsman can purchase a sufficient number of them to obtain the variety of graduations he needs for the same amount that the one triangular ruler will cost which embraces them all.

The kind of graduation on each leg can be indicated by large letters or figures stamped on the faces between the graduations and the apex, which can be distinguished at a glance.

Another excellent quality in this ruler is that it cannot be used wrong side up, nor placed in any position but that the draftsman will know at first sight the side he is using.

The tubular form of the apex A, upon which the fingers press to hold the ruler in position, is very convenient for manipulating and easy to the fingers, while they cannot be pressed directly upon the sharp corners of the rulers shown in Figs. 4 and 5 without producing pain, and perhaps injury.

I prefer to make my ruler of steel plate one-fortieth of an inch thick, which weighs 1.44 ounce to a foot in length; but they can be made of brass or any other suitable material.

The diagonal line of conical pricks shown at C is to be hardened to prevent them from being injured or worn by the points of dividers.

Graduations of hundredths of an inch are represented in Figs. 1 and 3. The first conical prick is one-hundredth of an inch from the last line of the graduation. The second prick is eleven-thousandths from that line and one-hundredth of an inch from the first prick. The third prick is twelve-thousandths from the line and two-hundredths from the first prick, and so on to the tenth prick, which is nineteen-thousandths from the line and nine-hundredths from the first prick. When the divisions are hundredths of an inch dividers can readily be set by this arrangement within one-thousandth of an inch, and draftsmen, machinists, and all who require fine measurements will find this device of great convenience and value.

Having described my invention, what I claim, and desire to secure by Letters Patent, is—

1. The ruler, substantially as hereinbefore described, the same being a two-leg graduated ruler having the apex in a convenient form for manipulation, for the purpose set forth.

2. A graduated ruler having a line of pricks at an angle with the lines of graduation, substantially as described, and for the purpose set forth.

SAML. DARLING.

Witnesses:
JOHN E. HALL,
CHAS. A. CAMPBELL.